(12) United States Patent
Caldwell et al.

(10) Patent No.: US 10,095,738 B1
(45) Date of Patent: Oct. 9, 2018

(54) DYNAMIC ASSIGNMENT OF LOGICAL PARTITIONS ACCORDING TO QUERY PREDICATE EVALUATIONS

(71) Applicant: Amazon Technologies, Inc., Seattle, WA (US)

(72) Inventors: Andrew Edward Caldwell, Santa Clara, CA (US); Michail Petropoulos, San Francisco, CA (US); Anurag Windlass Gupta, Atherton, GA (US)

(73) Assignee: Amazon Technologies, Inc., Seattle, WA (US)

( * ) Notice: Subject to any disclaimer, the term of this patent is extended or adjusted under 35 U.S.C. 154(b) by 255 days.

(21) Appl. No.: 14/978,842

(22) Filed: Dec. 22, 2015

(51) Int. Cl.
 G06F 17/30 (2006.01)
 G06F 7/00 (2006.01)

(52) U.S. Cl.
 CPC .. *G06F 17/30442* (2013.01); *G06F 17/30327* (2013.01); *G06F 17/30867* (2013.01)

(58) Field of Classification Search
 CPC ......... G06F 17/30442; G06F 17/30327; G06F 17/30867
 USPC ....................................................... 707/715
 See application file for complete search history.

(56) References Cited

U.S. PATENT DOCUMENTS

| | | | |
|---|---|---|---|
| 5,671,405 A | | 9/1997 | Wu et al. |
| 5,742,806 A | * | 4/1998 | Reiner .............. G06F 17/30445 |
| 6,081,799 A | | 6/2000 | Beavin et al. |
| 6,345,266 B1 | | 2/2002 | Ganguly et al. |
| 6,571,233 B2 | | 5/2003 | Beavin et al. |
| 7,346,612 B2 | | 3/2008 | Day et al. |
| 7,966,315 B2 | | 6/2011 | Okamoto et al. |
| 8,560,584 B2 | | 10/2013 | Gao et al. |
| 8,626,745 B2 | | 1/2014 | Okamoto et al. |
| 8,700,876 B2 | | 4/2014 | Shah et al. |
| 8,914,354 B2 | | 12/2014 | Au et al. |
| 2002/0116457 A1 | * | 8/2002 | Eshleman ............... H04L 29/06 709/203 |
| 2012/0143823 A1 | | 6/2012 | Jain et al. |
| 2013/0179880 A1 | * | 7/2013 | Edholm .............. G06F 9/45558 718/1 |
| 2014/0059052 A1 | * | 2/2014 | Yamamoto ........ G06F 17/30312 707/741 |
| 2014/0195542 A1 | | 7/2014 | Larson et al. |
| 2015/0120652 A1 | * | 4/2015 | Dittrich ............. G06F 17/30575 707/610 |

OTHER PUBLICATIONS

U.S. Appl. No. 14/484,991, filed Sep. 12, 2014, Anurag Windlass Gupta, et al.

* cited by examiner

*Primary Examiner* — Kuen S Lu
(74) *Attorney, Agent, or Firm* — Robert C. Kowert; Meyertons, Hood, Kivlin, Kowert & Goetzel, P.C.

(57) ABSTRACT

A data store may implement dynamically assign storage locations to logical partitions according to query predicate indexes. Query predicate indexes may be maintained for individual storage locations in a data store that indicate whether storage locations store data values that do not satisfy a query predicate. The query predicate indexes may be evaluated to assign the storage locations to one or multiple logical partitions. The logical partitions may then be utilized to provide access to data stored in the data store. In some embodiments, a logical partition may be a remote storage partition that identifies data in storage locations to copy to a remote data store.

20 Claims, 9 Drawing Sheets

DYNAMIC ASSIGNMENT OF LOGICAL PARTITIONS ACCORDING TO QUERY PREDICATE EVALUATIONS

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data storage and data management.

Figure 1:
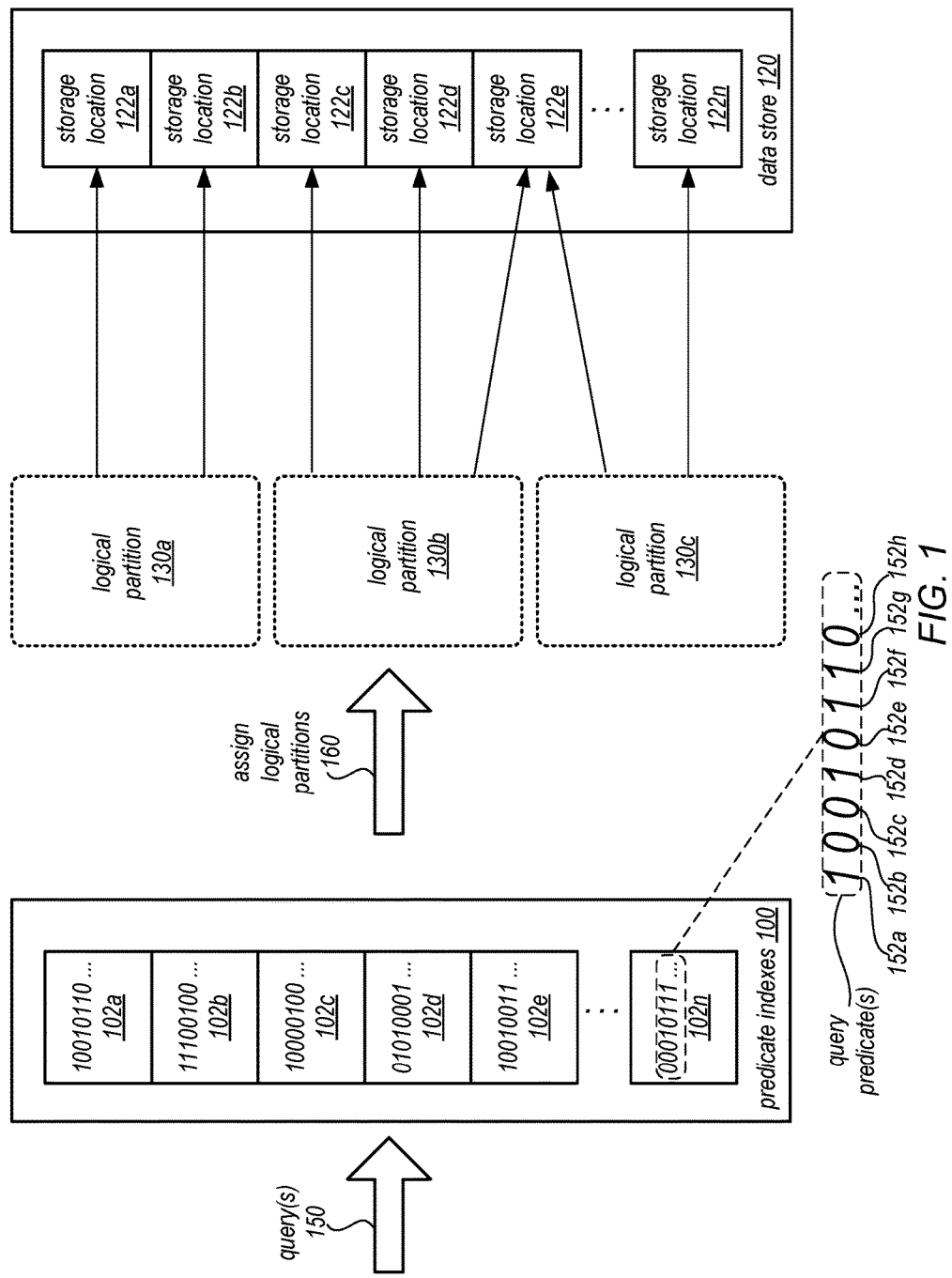
FIG. 1 illustrates a logical block diagram for dynamic assignment of logical partitions according to query predicate evaluations, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

In the following detailed description, numerous specific details are set forth to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments of dynamic assignment of logical partitions according to query predicate evaluations are described herein. Managing data stored in data stores increases in complexity and operational cost as the amount of data stored in the data store increases. In order to provide more efficient access to data maintained in a data store for various workloads, such as analytics workloads, indexing techniques may be implemented to organize the data, or instructing where certain data is located within underlying storage. B-trees, for instance, are a commonly implemented indexing technique for data stored in a relational database that organize data along a specified column to identify storage locations for specific query predicates. For example, a query predicate may be evaluated by walking/scanning the B-tree index to identify storage locations that may include data values that satisfy a query.

While indexing techniques provide different mechanisms for locating desired data within a data store, generating and maintaining indexes is not without cost. Indexes consume additional storage space that could be utilized to store additional data. Maintaining indexes may also require that changes to the data be synchronized with the index, to prevent the index from becoming stale, and thus ineffective for locating data. Physical partitions of data are another technique that allows for data to be described and organized. Data is separated according to a partitioning scheme (e.g. by separating different portions of data according to a range of values, such as time). For instance, physical partitions may separate data values in table so that a partition of data holds all of the associated data for a single month (e.g., a January partition, a February partition, a March partition, etc.). Unlike indexes, maintaining physical partitions of data is relatively simple, as data is either inserted or removed from the physical partition to which the data is assigned. Physical partitions, however, are inflexible, and are typically only definable at the creation of a data object that is being partitioned, such as a database table. Moreover, in some scenarios membership of data in more than one partition may be desirable for handling different requests for data. Logical partitions may provide flexible creation, which may be modified or redefined, and also may provide simple costs for management. Moreover, the assignment of storage locations to logical partitions may be dynamically performed based on client interaction with data to provide automated as well as user-specified logical partitions.

FIG. 1 illustrates a logical block diagram for dynamic assignment of logical partitions according to query predicate evaluations, according to some embodiments. Data store 120 may be a structured or semi-structured data store in various embodiments. For example, data store 120 may be a relational database or a non-relational database. Data may be stored for the data store in various storage locations 122a through 122n. A storage location 122 may be a defined location in which one or more data values for data store 120 are maintained. In at least some embodiments, storage locations 122 may represent data blocks or data pages.

Predicate indexes 100 may be implemented, in various embodiments, for storage locations 122 in order to identify which storage locations 122 do not store a data value that satisfies a query predicate (and thus do not need to be read when servicing a query that includes the query predicate). A respective predicate index 102 may be maintained for each individual storage location 122, in some embodiments. For example, predicate index 102a corresponds to storage location 122a, predicate index 102b corresponds to storage location 122b, etc. . . . Query predicate indexes 100 may be created when queries 150 are received for particular data at data store 120 which are not currently indexed. For example, if a query includes a query predicate that is not listed or defined in mapping information for predicate indexes 100, then the storage locations 122 may each have to be evaluated in order to service the query. In some embodiments, multiple query predicates may be received that are not included in the query predicate index, but only select ones of the predicates may be added to the query predicate index. The results of reading the storage locations for the new query predicate may be provided to a predicate index generator (such as predicate index generator 510 in FIG. 5) or some other module or component) which may create new mapping information and respective index values for the new query predicate to update each of the predicate indexes 102. For example, a new bit value may be added to a bitmap representing the query predicate index in some embodiments, which if not set may indicate that a data value that satisfies the new query predicate is not stored in the corresponding storage location 122. In at least some embodiments, predicate indexes 100 may be of fixed size (in order to maintain low cost index). As new query predicates are received in query(s) 150, predicates in the indexes 100 may be replaced with the new query predicates according to various replacement techniques, such as least recently used.

Thus, in various embodiments, the query predicates of previously received queries may be used to populate predicate indexes 100 for evaluating subsequent queries that include one or more matching query predicates. For example, if a query 150 is received query predicate index 102n may be evaluated. Corresponding query predicates in predicate indexes 100 may be identified for evaluation in various ways. For example, those query predicates that match (e.g., have the same set of data values identified, such as "gender=female") may be identified for evaluation. Query predicates included in an index may also correspond partially to an included query predicate (e.g., may be a larger set of data values than identified by the received query predicate, such as "sales>10,000" which includes "sales>15,000"). Query predicates in an index may also be combined to correspond to a new query (e.g., "5,000<units<10,000" may be identified in the combination of "units>2,500" and "units<13,000"). As noted above, in some embodiments, a query predicate index may be represented as a bitmap. For index 102, each bit may represent a different query predicate (which may be identified in mapping information and/or other metadata maintained for data store 120). For example, bit 152a may corresponding to one query predicate index in the index 102n, while bit 152 may correspond to a different query predicate in the index 102n, and so on. In some embodiments, a "0" bit, such as illustrated for bits 152b, 152c, 152e, and 152h, may indicate that a data value for the corresponding query predicate does not exist in storage location 122n. For those "1" bits, such as bits 152a, 152d, 152f, and 152g, queries including the corresponding query predicates may read storage location 122n in order to service the query.

Predicate indexes 100 may, in various embodiments, be evaluated to assign 160 storage locations 122 to logical partitions 130. For example, as discussed in the examples above if a query predicate indicates that a storage location does not include a value above a particular threshold, then that storage location can be assigned to a logical partition for values that are known not to be in one or more multiple predicates. In at least some embodiments, a user can specify the query predicates to use for assigning the logical partitions. Assignments may also be automatically or dynamically performed without user input to assign storage locations to logical partitions. For example, query predicates may be automatically selected (e.g., based on field data value type, name, etc.) and the selected query predicates may be evaluated in the query predicate indexes. In this way, different ranges of values may be located in different storage locations and may be assigned to different logical partitions 130. In addition to assigning, data retention schemes may be implemented to assign different storage locations to a remote storage partition. In this way, tiered storage may be provided, by physically copying data from the assigned storage locations 122 in data store 120 to a remote data store. The storage locations may then be reclaimed for other storage, in some embodiments, or remotely stored data may be maintained as a backup version of data that is also maintained in data store 120.

Please note that the previous description of a data store, predicate query indexes, and logical partitions are logical illustrations and thus are not to be construed as limiting as to the data store, storage locations, logical partitions, or query predicate indexes.

This specification begins with a general description of a data warehouse service that implements dynamic assignment of logical partitions according to query predicate evaluations. Then various examples of data warehouse, including different components/modules, or arrangements of components/module that may be employed as part of implementing the storage service are discussed. A number of different methods and techniques to implement dynamic assignment of logical partitions according to query predicate evaluations are then discussed, some of which are illustrated in accompanying flowcharts. Finally, a description of an example computing system upon which the various components, modules, systems, devices, and/or nodes may be implemented is provided. Various examples are provided throughout the specification.

It is not uncommon for clients (or customers, organizations, entities, etc.) to collect large amounts of data which may require subsequent storage or management. Although some clients may wish to implement their own data management system for this data, it is increasingly apparent that obtaining data management services may prove a more efficient and cost effective option for those clients who do not wish to manage their own data. For example, a small business may wish to maintain sales records and related data for future data analysis. Instead of investing directly in the data management system to maintain the data, and the expertise required to set up and maintain the system, the small business may alternatively find it more efficient to contract with a data management service to store and manage their data.

Figure 2:
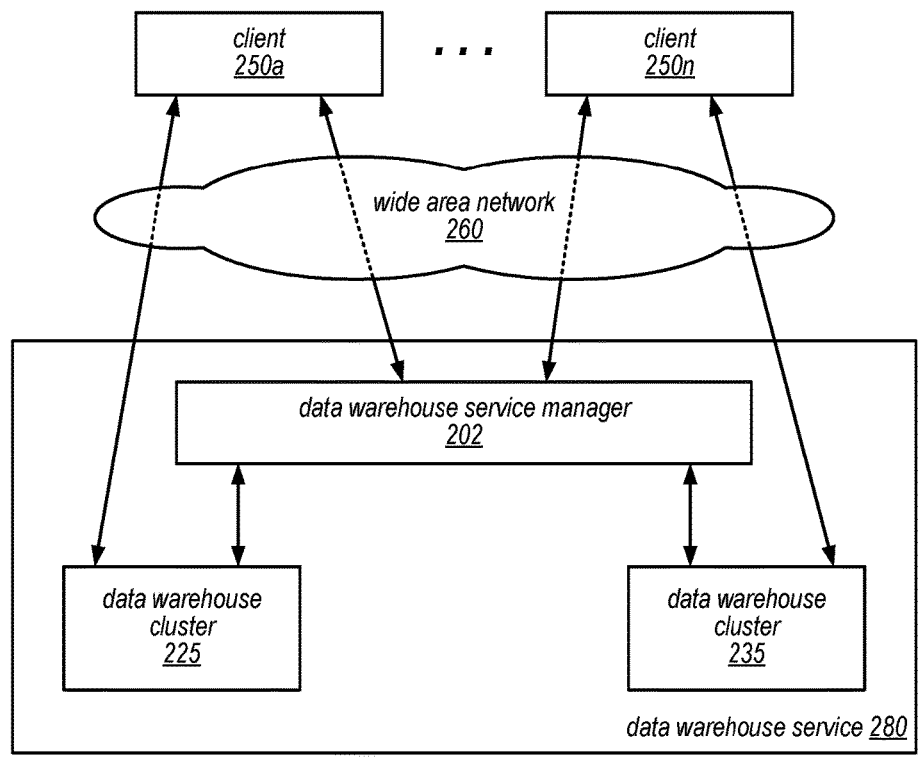
FIG. 2 is a block diagram illustrating an example distributed data warehouse service that implements dynamic assignment of logical partitions, according to some embodiments.

A data management service, such as a distributed data warehouse service discussed below with regard to FIGS. 2 through 4, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as related to implementing dynamic predicate indexing may be equally configured or adapted to implement embodiments for various other types of relational database systems, such as row-oriented database systems. Therefore, the following examples are not intended to be limiting as to various other types or formats of relational database systems. Similar techniques may also be implemented for other types of storage systems, whether structured or semi-structured which may not be implemented as a data warehouse.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data). For example, for database operations that only need to access and/or operate on one or a small number of columns at a time, less memory space may be required than with traditional row-based storage, since only data blocks storing data in the particular columns that are actually needed to execute a query may be retrieved and stored in memory. To increase the efficiency of implementing a columnar relational database table, a multi-column index may be generated to indicate the data values likely stored in data blocks storing data for the indexing columns of a columnar relational database table, which may be used to determine data blocks that do not need to be read when responding to a query.

As discussed above, various clients (or customers, organizations, entities, or users) may wish to store and manage data using a data management service. FIG. 2 illustrates an example distributed data warehouse system that may provide data management services to clients, according to some embodiments. Specifically, distributed data warehouse clusters may respond to store requests (e.g., to write data into storage) or queries for data (e.g., such as a Server Query Language request (SQL) for select data), along with many other data management or storage services.

Multiple users or clients may access a distributed data warehouse cluster to obtain data warehouse services. Clients which may include users, client applications, and/or data warehouse service subscribers), according to some embodiments. In this example, each of the clients 250*a* through 250*n* is able to access distributed data warehouse cluster 225 and 235 respectively in the distributed data warehouse service 280. Distributed data warehouse cluster 225 and 235 may include two or more nodes on which data may be stored on behalf of the clients 250*a* through 250*n* who have access to those clusters.

A client, such as clients 250*a* through 250*n*, may communicate with a data warehouse cluster 225 or 235 via a desktop computer, laptop computer, tablet computer, personal digital assistant, mobile device, server, or any other computing system or other device, such as computer system 1000 described below with regard to FIG. 9, configured to send requests to the distributed data warehouse clusters 225 and 235, and/or receive responses from the distributed data warehouse clusters 225 and 235. Requests, for example may be formatted as a message that includes parameters and/or data associated with a particular function or service offered by a data warehouse cluster. Such a message may be formatted according to a particular markup language such as Extensible Markup Language (XML), and/or may be encapsulated using a protocol such as Simple Object Access Protocol (SOAP). Application programming interfaces (APIs) may be implemented to provide standardized message formats for clients, such as for when clients are communicating with distributed data warehouse service manager 202.

Clients 250a through 250n may communicate with distributed data warehouse clusters 225 and 235, hosted by distributed data warehouse service 280 using a variety of different communication methods, such as over Wide Area Network (WAN) 260 (e.g., the Internet). Private networks, intranets, and other forms of communication networks may also facilitate communication between clients and distributed data warehouse clusters. A client may assemble a message including a request and convey the message to a network endpoint (e.g., a Uniform Resource Locator (URL)) corresponding to the data warehouse cluster). For example, a client 250a may communicate via a desktop computer running a local software application, such as a web-client, that is configured to send hypertext transfer protocol (HTTP) requests to distributed data warehouse cluster 225 over WAN 260. Responses or other data sent to clients may be formatted in similar ways.

In at least some embodiments, a distributed data warehouse service, as indicated at 280, may host distributed data warehouse clusters, such as clusters 225 and 235. The distributed data warehouse service 280 may provide network endpoints to the clients 250a to 250n of the clusters which allow the clients 250a through 250n to send requests and other messages directly to a particular cluster. As noted above, network endpoints, for example may be a particular network address, such as a URL, which points to a particular cluster. For example, client 250a may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Distributed data warehouse clusters, such as data warehouse cluster 225 and 235, may be made up of one or more nodes. These clusters may include different numbers of nodes. A node may be a server, desktop computer, laptop, or, more generally any other computing device, such as those described below with regard to computer system 1000 in FIG. 9. In some embodiments, the number of nodes in a data warehouse cluster may be modified, such as by a cluster scaling request. Nodes of a data warehouse cluster may implement one or more data slices for storing data. These data slices may be part of storage devices, such as the disk storage devices discussed below with regard to FIGS. 3 and 4. Clusters may be configured to receive requests and other communications over WAN 260 from clients, such as clients 250a through 250n. A cluster may be configured to receive requests from multiple clients via the network endpoint of the cluster.

In some embodiments, distributed data warehouse service 280 may be implemented as part of a network-based service that allows users to set up, operate, and scale a data warehouse in a cloud computing environment. The data warehouse clusters hosted by the network-based service may provide an enterprise-class database query and management system that allows users to scale the clusters, such as by sending a cluster scaling request to a cluster control interface implemented by the network-based service. Scaling clusters may allow users of the network-based service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

In various embodiments, distributed data warehouse service 280 may provide clients (e.g., subscribers to the data warehouse service provided by the distributed data warehouse system) with data storage and management resources that may be created, configured, managed, scaled, and terminated in response to requests from the storage client. For example, in some embodiments, distributed data warehouse service 280 may provide clients of the system with distributed data warehouse clusters composed of virtual compute nodes. These virtual compute nodes may be nodes implemented by virtual machines, such as hardware virtual machines, or other forms of software implemented to simulate hardware configurations. Virtual nodes may be configured to perform the same tasks, functions, and/or services as nodes implemented on physical hardware.

Distributed data warehouse service 280 may be implemented by a large collection of computing devices, such as customized or off-the-shelf computing systems, servers, or any other combination of computing systems or devices, such as the various types of devices described below with regard to FIG. 9. Different subsets of these computing devices may be controlled by distributed data warehouse service manager 202. Distributed data warehouse service manager 202, for example, may provide a cluster control interface to clients, such as clients 250a through 250n, or any other clients or users who wish to interact with the data warehouse clusters managed by the distributed data warehouse manager 202, which in this example illustration would be distributed data warehouse clusters 225 and 235. For example, distributed data warehouse service manager 202 may generate one or more graphical user interfaces (GUIs) for storage clients, which may then be utilized to select various control functions offered by the control interface for the distributed data warehouse clusters hosted in the distributed data warehouse service 280.

Figure 3:
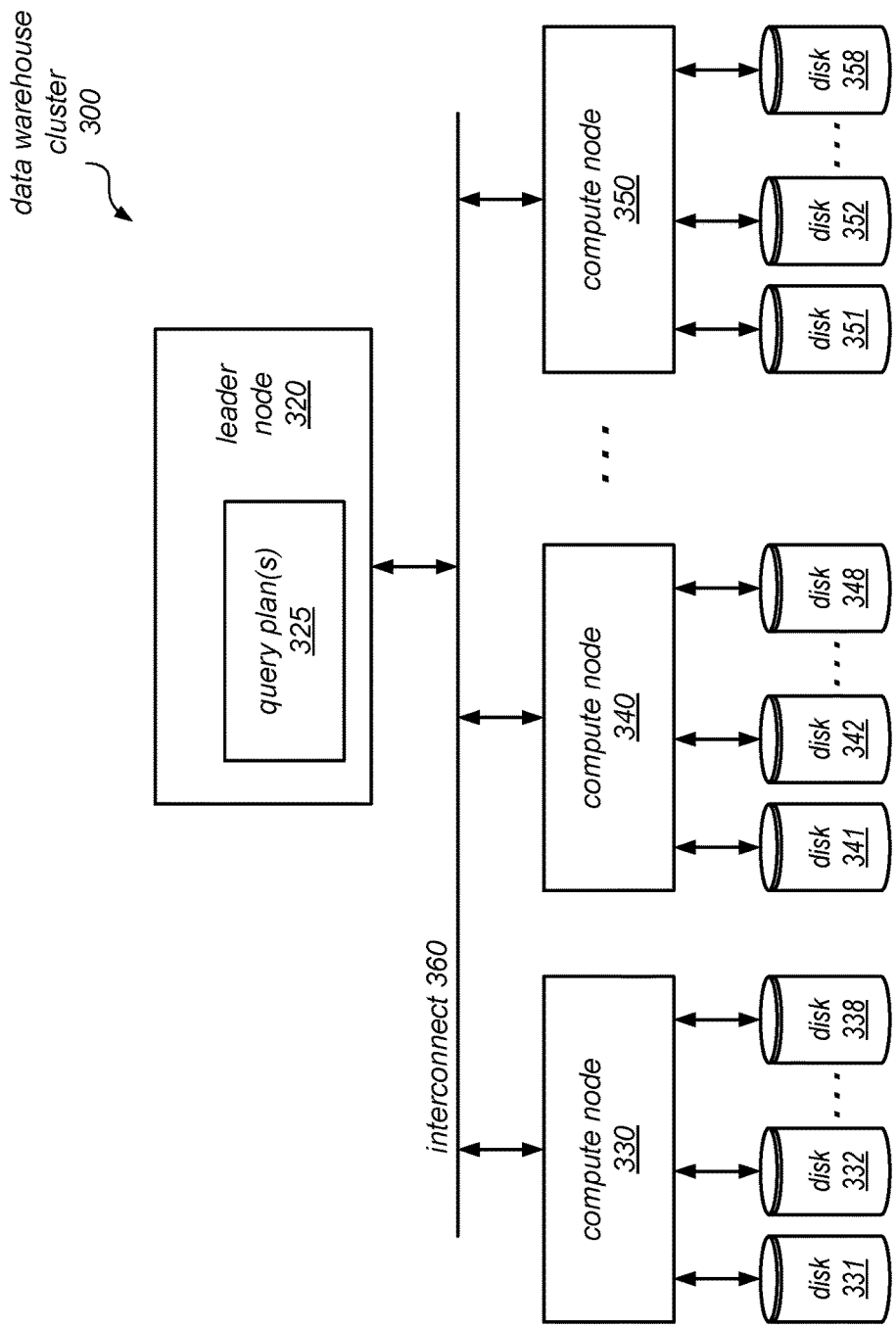
FIG. 3 is a block diagram illustrating an example distributed data warehouse cluster, according to some embodiments.

FIG. 3 is a block diagram illustrating a distributed data warehouse cluster in a distributed data warehouse service, according to one embodiment. As illustrated in this example, a distributed data warehouse cluster 300 may include a leader node 320 and compute nodes 330, 340, and 350, which may communicate with each other over an interconnect 360. Leader node 320 may generate and/or maintain one or more query plans 325 for executing queries on distributed data warehouse cluster 300. As described herein, each node in a distributed data warehouse cluster may include multiple disks on which data blocks may be stored on behalf of clients (e.g., users, client applications, and/or distributed data warehouse service subscribers). In this example, compute node 330 includes disks 331-338, compute node 340 includes disks 341-348, and compute node 350 includes disks 351-358. In some embodiments, a component of the distributed data warehouse cluster (or the distributed data warehouse system of which it is a component) may support load balancing, using any of a variety of applicable load balancing techniques. For example, in some embodiments, leader node 320 may include a load balancing component (not shown).

In at least some embodiments, distributed data warehouse cluster 300 may be implemented as part of the web based data warehousing service, such as the one described above, and includes a leader node 320 and multiple compute nodes, such as compute nodes 330, 340, and 350. The leader node 320 may manage communications with storage clients, such as clients 250a through 250n discussed above with regard to FIG. 2. For example, a leader node may be a server that receives requests from various client programs (e.g., applications) and/or subscribers (users), then parses them and develops an execution plan (e.g., query plan(s) 325) to carry out the associated database operation(s). More specifically, the leader node may develop the series of steps necessary to obtain results for complex queries and joins. Leader node 320 may also manage the communications among compute nodes 330 through 350 instructed to carry out database operations for data stored in the distributed data warehousing cluster 300. For example, compiled code may be distributed by leader node 320 to various ones of the compute nodes 330 to 350 to carry out the steps needed to perform queries, and intermediate results of those queries may be sent back to the leader node 320. Leader node 320 may receive data and query responses or results from compute nodes 330, 340, and 350. A database schema and/or other metadata information for the data stored among the compute nodes, such as the data tables stored in the cluster, may be managed and stored by leader node 320.

Distributed data warehousing cluster 300 may also include compute nodes, such as compute nodes 330, 340, and 350. These one or more compute nodes (sometimes referred to as storage nodes), may for example, be implemented on servers or other computing devices, such as those described below with regard to computer system 1000 in FIG. 9, and each may include individual query processing "slices" defined, for example, for each core of a server's multi-core processor. Compute nodes may perform processing of database operations, such as queries, based on instructions sent to compute nodes 330, 340, and 350 from leader node 320. The instructions may, for example, be compiled code from execution plan segments and steps that are executable by the particular data compute node to which it is sent. Data compute nodes may send intermediate results from queries back to leader node 320 for final aggregation. Each data compute node may be configured to access a certain memory and disk space in order to process a portion of the workload for a query (or other database operation) that is sent to one or more of the compute nodes 330, 340 or 350. Thus, compute node 330, for example, may access disk 331, 332, up until disk 338.

Disks, such as the disks 331 through 358 illustrated in FIG. 3, may be may be implemented as one or more of any type of storage devices and/or storage system suitable for storing data accessible to the data compute nodes, including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store columnar database tables through various column-oriented database schemes.

In some embodiments, each of the compute nodes in a distributed data warehouse cluster may implement a set of processes running on the node server's (or other computing device's) operating system that manage communication with the leader node, e.g., to receive commands, send back data, and route compiled code to individual query processes (e.g., for each core or slice on the node) in order to execute a given query. In some embodiments, each of compute nodes includes metadata for the blocks stored on the node. In at least some embodiments this block metadata may be aggregated together into a superblock data structure, which is a data structure (e.g., an array of data) whose entries store information (e.g., metadata about each of the data blocks stored on that node (i.e., one entry per data block). In some embodiments, each entry of the superblock data structure includes a unique ID for a respective block, and that unique ID may be used to perform various operations associated with data block. For example, indications of column-specific compression techniques applied to the data stored in the data block, indications of default compression techniques applied to the data stored in the data block, probabilistic data structures that indicate data values not stored in a data block may all be stored in the respective entry for a data block, or assignments to one or more multiple logical partitions. In some embodiments, the unique ID may be generated (and a corresponding entry in the superblock created) by the leader node or by a computing node when the data block is first written in the distributed data warehouse system. In at least some embodiments, an entry in the superblock may be maintained that indicates the query predicate indexes for entries stored in the superblock.

Figure 4:
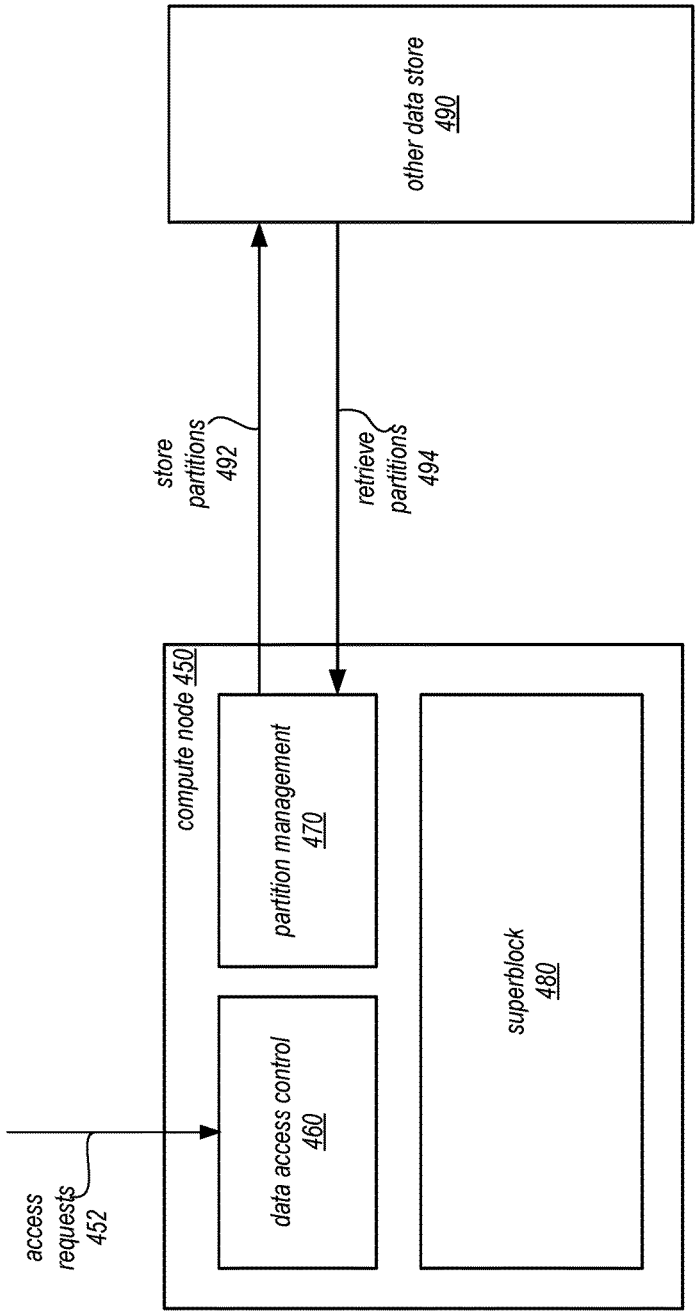
FIG. 4 is a block diagram illustrating an example compute node, according to some embodiments.

FIG. 4 illustrates an example of a compute node, according to some embodiments. Access requests 452, such as the various queries, query plans, and/or other messages sent from a leader node, such as leader node 320, to a compute node 450. A data access control 460, such as described in further detail below with regard to FIG. 5, may process access requests, directing reads, writes, and other access operations to attached persistent storage devices. Various different hardware and software devices may be used singly or in combination to implement data access control 460. When processing queries, data access control 460 may examine the entries query predicate index values in the superblock 480 for each data block storing data for the database table to identify data blocks to be read in order to service the query, and then read the identified data blocks storing data. In at least some embodiments, data access control 460 may identify the logical partition assignments of data blocks in superblock 480 in order to exclude those data blocks from partitions which need not be read in order to service a query.

Partition management 470 may manage the creation, assignment, modification, and retention of partitions, in some embodiments. Query predicates identified for evaluating query predicate indexes and assigning data blocks to logical partitions may be maintained at partition management 470. In some embodiments, partition management 470 may automatically select new predicates to evaluate in order to create a new logical partition. For instance, instead of evaluating predicates that correspond to annual or quarterly time increments, partition management 470 may identify predicate values which indicate monthly time increments and perform evaluations and assignments to create new logical partitions according to months. Partition management 470 may receive indications of user-specified predicates (e.g., via a leader node or control plane component) in order to create a new logical partition according to the user-specified predicates.

In addition to evaluate, assigning, and creating logical partitions, partition management 470 may implement mechanisms to change the underlying physical storage locations for data based on logical partition assignments. For instance, as illustrated in FIG. 4, partition management 470 may store data blocks and/or partitions 492 identified for remote storage at other data store 490. In some instances, partition management 494 may retrieve partitions 494 (e.g., in response to a modification logical partition assignment, client request or other need to store data at compute node 450. In this way, partition management 470 may provide automated management of tiered storage for partitions stored in other data store 490.

In some embodiments, a compute node 450 may also include a superblock data structure 480, such as the superblock data structure described above, stored locally at the compute node or stored remotely, but accessible to the compute node, which may include respective entries for the data blocks stored on the compute node 450 which store block metadata including query predicate indexes, as well as other information, for the data blocks. Note, however, that in some embodiments, metadata for data blocks may be stored in multiple different locations, such as in the data block itself, or in in other individual data structures. Therefore, the superblock data structure 480 is not intended to be limiting as to the various other structures, locations, methods, or techniques which might be applied to preserve metadata information for the data block. In some embodiments, superblock 480 may be a passive data structure that includes the aforementioned metadata, while in other embodiments superblock 480 may include various processes and components to manage interaction with the metadata, including interactions between data access control 460 and data stored on attached persistent storage devices, such as discussed below with regard to FIG. 5.

Figure 5:
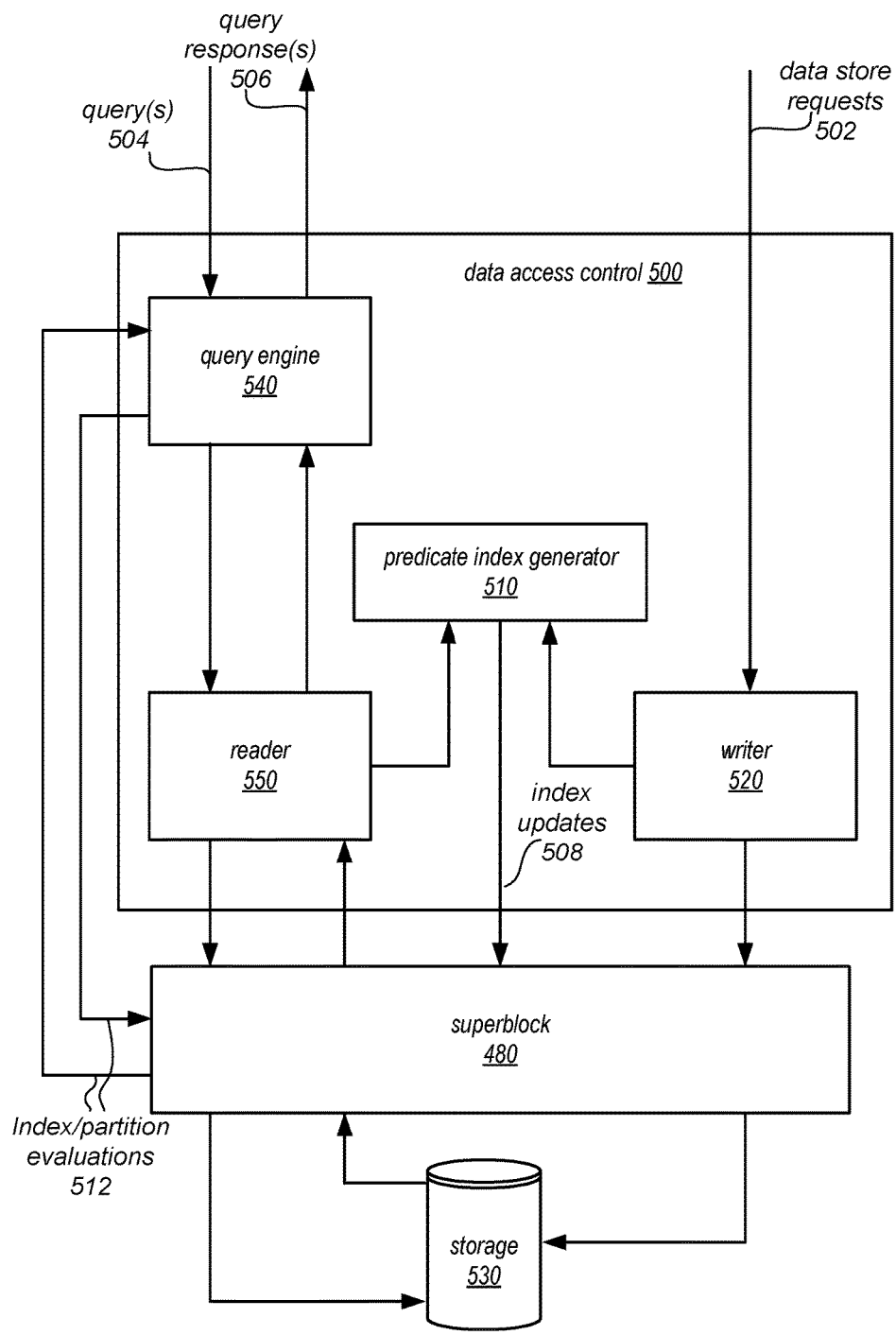
FIG. 5 is a block diagram illustrating an example data access control that implements processing queries according to logical partitions, according to some embodiments.

As discussed above, a compute node may be configured to receive access requests, such as queries, storage operations, and other data management operations. FIG. 5 is a block diagram illustrating an example data access control that implements processing queries according to a query predicate index, according to some embodiments. Queries 504 and data store requests 502, or indications of queries or data store requests, may be received as inputs to data access control 500. Data access control 500 may communicate with storage 530, which may store a plurality of data blocks for multiple columns of a columnar database table. Data for the multiple columns may be stored in the data blocks in storage 530, and data access control 500 may be configured to both store this data and read this data from storage.

Portions or all of data access control 500 may be implemented on a compute node, such as compute node 450 described above with regard to FIG. 4. Although depicted in as implemented in a compute node in FIG. 4, data access control 500, or components or modules of data access control 500, such as predicate index generator 510 may be implemented in leader node 320, described above with regard to FIG. 3, or some other component or module of the data warehouse service. Various different configurations of hardware and software components may be used to implement the data access control 500 as well as the components or modules illustrated within. Also note that, although different modules or components are illustrated within data access control 500 as one or more distinct modules or devices, these various components may be combined together, located differently, or alternatively configured to implement dynamic predicate indexing for data stores, and therefore, the following description of FIG. 5 is not intended to be limiting as to the various other ways a data access control or similar control or device may be implemented.

Data store requests 502 which may include data to be stored for a columnar relational database table stored in storage 530. For example, the data for storage in a data block in storage 530 may be obtain the data via an Open Database Connectivity (ODBC) and/or Java Database Connectivity (JDBC) driver interface or other component that is configured to receive storage request information and data for storage. Dynamic predicate index generator 510 may receive as input the data to be stored for the database table in storage 530 from writer 520.

Predicate generator 510 may store, update, or send predicate index values 508 generated/modified for the columnar relational database table to superblock 480 may be aggregated metadata for the blocks in storage 530, such as the superblock data structure 480 described above with regard to FIG. 4. Thus bitmaps or other representations of the query predicate indexes for individual data blocks in storage 530 may be updated according to the storage requests 502 received.

A writer 520 may also be implemented by data access control 500 to store the data for data blocks in the data blocks in storage 530. In at least some embodiments, writer 520 may be configured to sort the entries of the columnar relational database table according to primary key values for each respective entry and direct the storage 530 to store the columnar relational database table according the sorted order. In some embodiments, as illustrated in FIG. 5, write requests may pass through superblock 480 in order to update or insert new metadata describing the data stored in requests 502.

Data access control 500 may also receive queries 504, or indications of queries, such as query plans or other instructions for servicing queries for particular data stored in storage 530. For example, a leader node, such as leader node 320 described above with regard to FIG. 3, may receive a query from a storage client, and generate a query execution plan which sends the query to a compute node implementing data access control 500. Data access control 500 may implement a query engine 540 to receive and process the queries. As discussed above queries may be instructions to be executed according to a query plan, but may also be more generally any type of request for data that meets a specified criterion or is generated by a specified process. In some embodiments, a query, or an indication of a query, may include one or more predicates that identify particular data for processing the query. For example, an SQL query may include predicates that specify conditions to be met for data to be retrieved, such as "WHERE customer='small' AND customer='medium'." In some embodiments, there may different types of queries. Some types of query predicates may require filtering on point values (e.g., all records where the state value="Texas"). Other predicates may request larger groups of data, such as range predicates that filter data based on a range of data values (e.g., all purchase orders for with purchase prices between $1,000 and $10,000). Some queries may indicate data joins that join records from one table in database based on a corresponding value obtained from another database. (e.g., join the records from of a personal database that includes an indication of a particular work department with those records of employee personal information that include the same work department). As query engines 540 are well-known to those of ordinary skill in the art, the previous description is not intended to be limiting as to the many different techniques and implementations of a query engine. For example, a standard query engine configured to process standard database protocol messages, such as SQL requests, may be implemented, or alternatively, a query engine that processes customized queries, such as those specified by an API may be used.

Figure 6:
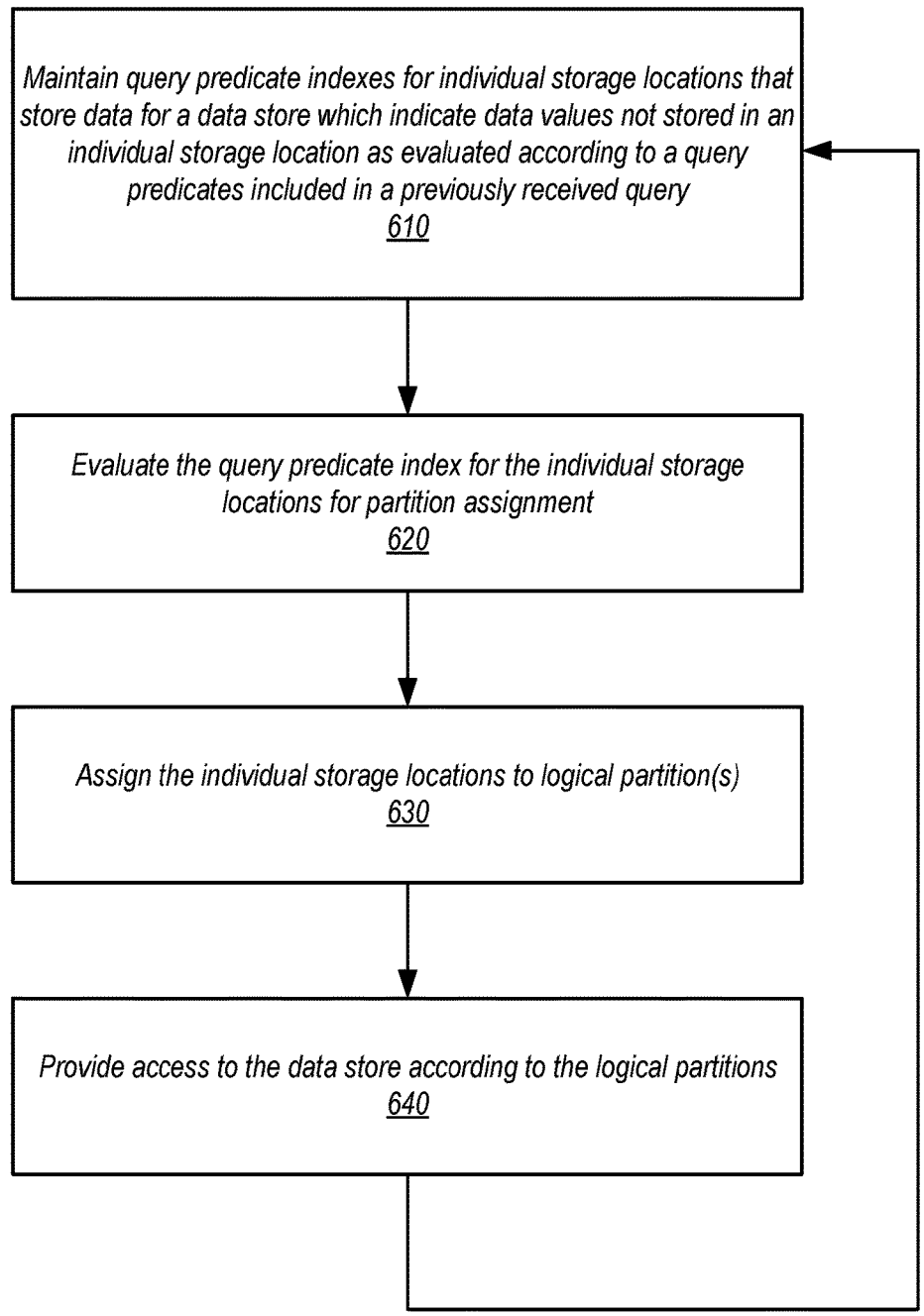
FIG. 6 is a high-level flowchart illustrating a method to implement dynamic assignment of logical partitions according to query predicate evaluations, according to some embodiments.
Figure 7:
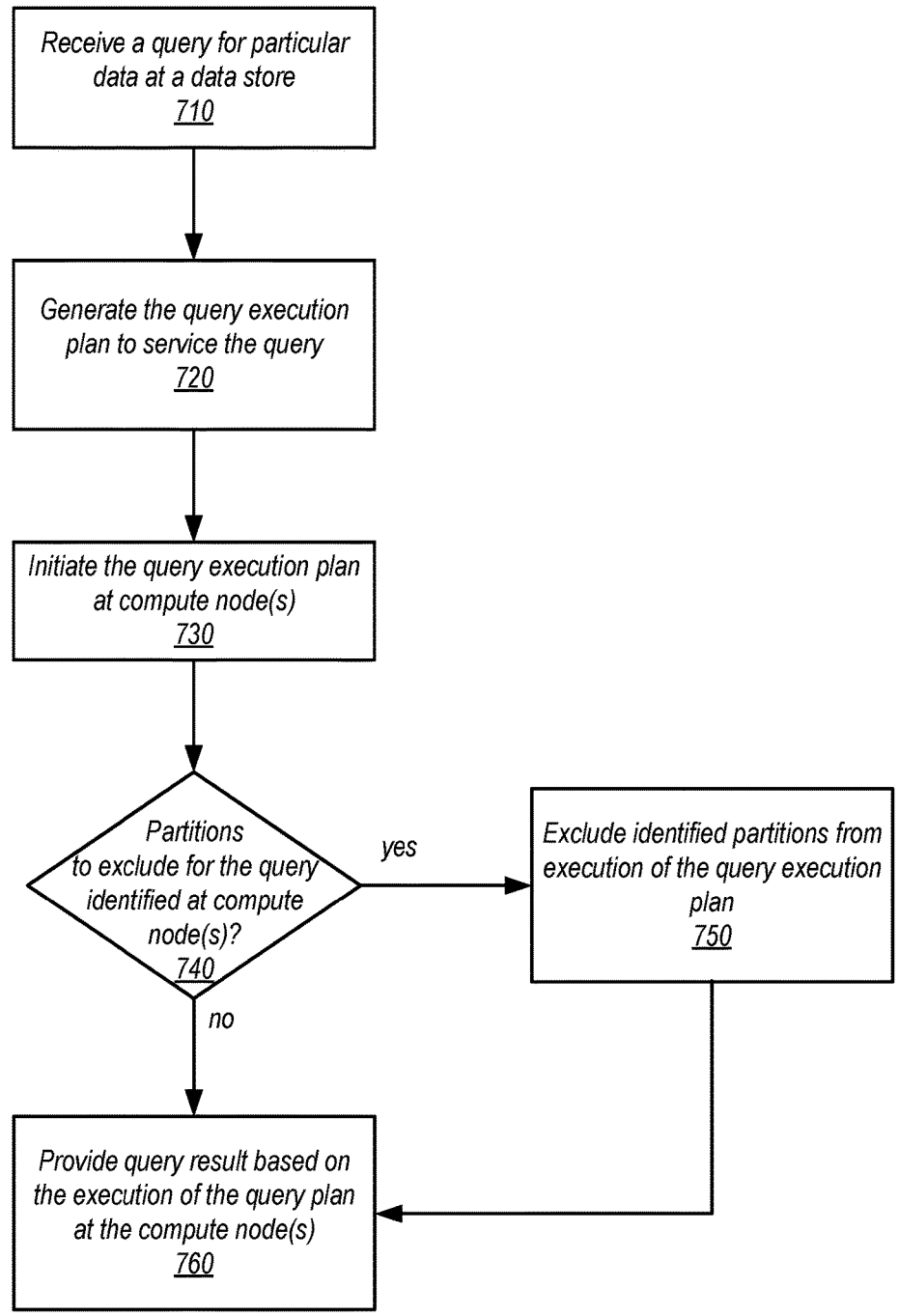
FIG. 7 illustrates a high-level flowchart of a method to implement for generating query execution plans based on logical partitions, according to some embodiments.

In some embodiments, therefore, a query engine 520 may receive an indication of a query 504 including one or more query predicates for the columnar relational database table in storage 530 for particular data. Query engine 540 may evaluate the query to identify query predicates which may be included in the query predicate index. For example, query engine 540 may scan index evaluations 512 (e.g., bitmaps or other representations of query predicate indexes stored in super block 480) and/or logical partition assignments to determine which data blocks to read for servicing a query based on the query predicates included in the query. For those logical partitions that indicate data to satisfy a query is not included in the assigned data blocks, query engine 540 may exclude the identified partitions. FIGS. 6 and 7, discussed in further detail below, describes some of the various methods and techniques that may be used to process queries using logical partitions. Query engine 540 may then direct reader 550 to read the identified data blocks storing data for the columnar relational database table in order service the query.

In at least some embodiments, data access control 500 may include reader 550. Reader 550 may perform read operations to obtain data from storage 530. In some embodiments, reader 550 may be directed by query engine 540 to read certain data blocks for a column of the columnar relational database table and return the read data to query engine 540 for further processing. Query engine 540 may then provide at least some of the data in a query response 506 to a storage client, leader node, or other requesting system or device, or process, filter, manipulate, or otherwise change the data read from storage 530 in accordance with the received query. In at least some embodiments, reader 550 may also transfer data read from storage 530 to a database cache (not illustrated) or other module or device part that provides storage for more frequently accessed data when processing queries 504. Query engine 540 may then access the cache or other module with requesting new read operations of the reader 550. As a variety of different caching techniques for data management and storage systems are well-known to those of ordinary skill in the art, the previous examples are not intended to be limiting. In some embodiments, as illustrated in FIG. 5, read requests and responses may pass through superblock 480 in order to update or insert new metadata describing the data stored in query(s) 502 and query response(s) 506.

As illustrated in FIG. 5, reader 550 may provide results of the read request to predicate index generator 510. If one or more of the query predicates for the query is new, predicate index generator 510 may create new index values for the data blocks of storage 530 to indicate those data blocks that do not store data that satisfies the new query predicate (for data blocks where it is unknown, or positively known that the data values exist, the index may be set to indicate that the data blocks should be read for processing a subsequent query including the new query predicate).

While FIGS. 2 through 5 have been described and illustrated in the context of a data warehouse service implementing a column-oriented relational database, the various components illustrated and described in FIGS. 2 through 5 may be easily applied to other data management systems that provide data management and/or storage services for a relational database table, which may include various other data formats, such as a row-oriented relational database. As such, FIGS. 2 through 5 are not intended to be limiting embodiments in a data warehouse cluster, nor limiting a description of a data storage and management cluster. Moreover, the data warehouse service is provided as an example of a data store which may implement dynamic assignment of logical partitions according to query predicate evaluations, which may also be implemented for a variety of other different data stores. Different types of structured or semi-structured data models may be implemented at these different data stores, each of which may be indexed using dynamic assignment of logical partitions according to query predicate evaluations.

FIG. 6 is a high-level flowchart illustrating a method to implement dynamic assignment of logical partitions according to query predicate evaluations, according to some embodiments. Various different systems and devices may implement the various methods and techniques described below, either singly or working together. For example, a leader node and/or a compute node, such as described above with regard to FIGS. 3-5, and a query engine, such as query engine 540, may be configured to implement the various methods. Alternatively, a combination of different systems and devices, such as the multiple compute nodes illustrated in FIG. 3 working together, for example, may also perform the below method and techniques, as well as a leader node 320, also illustrated in FIG. 3. Therefore, the above examples and or any other systems or devices referenced as performing the illustrated method, are not intended to be limiting as to other different components, modules, systems, or configurations of systems and devices.

As indicated at 610, respective query predicate indexes for individual storage locations storing a portion of data maintained as part of a data store may be maintained. The respective query predicate index may indicate which data values are not stored in an individual storage location as evaluated according to query predicates included in a previously received query, in some embodiments. For example, a previous query predicate that identifies "employees WHERE salary >100,000" may be mapped to an index value in the query predicate index. An index value for each storage location may indicate whether or not the storage location should be read to possibly retrieve data values that satisfy the query predicate (e.g., employees with salaries >100,000). For those storage locations not indicated to be read, it may be determined that a data value that satisfies the query predicate is not stored in the storage location.

The size of a query predicate index may be fixed or limited to a particular number of query predicates or may be increased as needed to store additional query predicates, in some embodiments. Query predicate indexes may be stored in various formats for efficient indexing. For example, in at least some embodiments, query predicate indexes may be represented as a bitmap. Each storage location may have a respective bitmap indicating whether a storage location should be read in order to service a query including the query predicates in the query predicate index. For example, a "1" may be stored to indicate that the storage location should be read, whereas a "0" may indicate that a data value is not stored in the storage location that satisfies the corresponding query predicate. Utilizing bitmaps a large number of query predicates may be indexed for a particular storage location efficiently (e.g., a 100 byte index may provide 800 predicate bits). Mapping information and/or other metadata may be maintained describing the query predicate, and the corresponding index value in the query predicate index (e.g., predicate→"X<Y", bitmap offset→37). Updates to the underlying data, or additional data may be added to the bitmap for a storage location, performing simple binary operations to flip the bit values to "1" or "0" respectively.

As indicated at 620, the query predicated index for the individual storage locations may be evaluated for partition assignment. For example, different ranges of data may be identified (e.g., by examining which storage locations are excluded from which query predicates) and logical partitions may be identified and assigned based on the identified ranges. As indicated at 630, the individual storage locations may be assigned to logical partitions according to the evaluations of the query predicate indexes. For instance, mapping information, such as may be maintained in a superblock like superblock 480 in FIG. 4 above, may be updated to reflect assignments of storage locations to different logical partitions.

As indicated at 640, access may be provided to the data store according to the logical partitions. For example, various operations to manage the data of the data store, such as operations to drop, copy, or otherwise modify a partition may be performed with respect to a selected logical partition. In at least some embodiments, logical partitions may be utilized to evaluate queries, such as discussed below.

FIG. 7 illustrates a high-level flowchart of a method to implement generating query execution plans based on logical partitions, according to some embodiments. A query may be received for particular data at a data store, as indicated at 710. The query may include various query predicates which may, in some instances, correspond to values included or excluded by logical partitions. Queries for data may be formatted in many different ways as may be acceptable to the type of data store. For example, structured query language (SQL) queries may be received for data stores implementing relational databases, in some embodiments. Query predicates may generally provide an evaluation of particular data such that the particular data can be identified to satisfy or not satisfy the query predicate, and thus be included in the particular data (if meeting all other included query predicates).

As indicated at 720, a query execution plan to service the query may be generated. For example, in a distributed data store various physical partitions of data (e.g., according to various partitioning mechanisms, such as striping, sharding, or any other form data distribution) may be implemented. A query execution plan may be generated to determine how data in the different locations is to be evaluated, joined together, or otherwise combined to satisfy the query. In at least some embodiments, a query plan may include the generation of additional code, commands, or other information that may be provided to execute the query plan.

As indicated at 730, the query execution plan may be imitated at one multiple compute node(s), in some embodiments. For example, a request including the query plan instructions specific to a particular compute node (or the specific instructions for all compute nodes) may be provided to the compute nodes storing data toward which the query is directed (e.g., storing a table to which the query is directed). Compute nodes, as noted above, may maintain metadata describing the data stored at the compute nodes, such as a superblock structure similar superblock 480 in FIG. 4. In order to execute the query execution plan, the compute nodes may evaluate predicates or other indications of predicates within the query execution plan in order to identify which storage locations may need to be read in order to satisfy the query. For example, in at least some embodiments, logical partition assignments may be evaluated with respect to query predicates included in the query execution plan to identify whether or not a logical partition should be excluded, as indicated at 740. For those logical partitions identified for exclusion, the compute nodes may not direct read or write access requests to the storage locations assigned to the logical partitions in order to exclude the identified partitions from execution of the query execution plane, as indicated at 750. Consider an example where logical partition assignments are based upon a range value, such as time, and the query is for range of time that is not included in some logical partitions. According to the evaluation indicated at 740, those logical partitions may be identified for exclusion from execution of the query execution plan.

As indicated at 760, a query result may be provided based on the execution of the query plan at the compute node(s), in various embodiments. For instance, the results generated from accessing data blocks (excepting those assigned to logical partitions excluded at 740 and 750) may be combined at a leader node of a warehouse cluster and returned to a requesting client.

Figure 8:
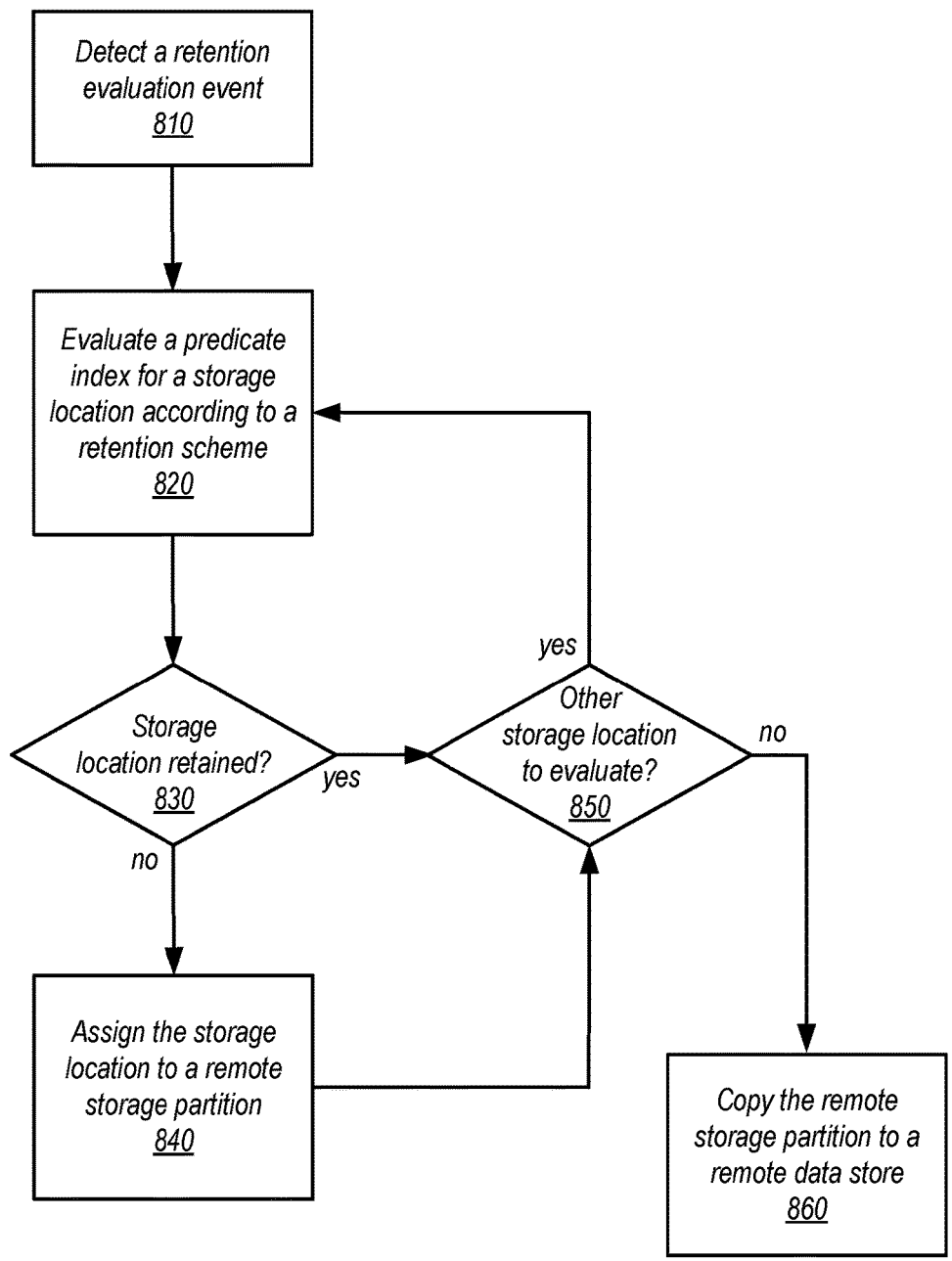
FIG. 8 illustrates a high-level flowchart of a method to assign storage locations to a remote storage partition, according to some embodiments.

Logical partitions may also be utilized to provide flexible management of different portions of data, moving, or relocating data based on logical partition assignments identified by evaluation of predicate indexes. In some embodiments, tiered storage architectures may be utilized to move data that is infrequently accessed to lower cost and slower to retrieve storage. Such movements may be performed dynamically in response to the dynamic assignment of storage locations to a remote storage partition. FIG. 8 illustrates a high-level flowchart of a method to assign storage locations to a remote storage partition, according to some embodiments. As indicated at 810, a retention evaluation event may be detected in various embodiments. A retention evaluation event may be triggered by a lapse in a period of time (e.g., after 24 hours), a volume or number of requests directed to a data store or object (e.g., volume of updates to a particular table), after an amount of new data stored to a data store (e.g., after 2 Gigabytes of data is inserted into a table), or any other indication/determination that moving data into another data store may be beneficial (e.g., available storage space falls below a threshold).

In response to detecting the retention evaluation event, the predicate index for a storage location may be selected for evaluation according to a retention scheme, as indicated at 820. A retention scheme may identify the retention evaluation events, evaluations, remote storage locations, copy transport mechanisms, and whether copied data is deleted or otherwise reclaimed at local storage. For example, a retention scheme may indicate an examination as to whether any bits in a bitmap are set for a storage location. If none are set, then it may be determined that the storage location does not contain any data values that have satisfied recent query predicates, a condition indicated in the retention scheme which triggers the assignment of the storage location to a remote storage partition. In some embodiments, a retention scheme may be weighted, so that the evaluation of whether or not the storage location has been utilized for more recent queries outweighs indications for older queries. Once a determination as to whether storage location is to be retained is made, as indicated 830, the storage location may either be assigned to a remote storage partition, or another storage location may be selected for an evaluation, as indicated at 850. Assignments to a remote storage partition may be performed in order to schedule, queue, mark, or otherwise identify the assigned storage locations for copying to a remote data store (as illustrated in FIG. 4 above). If all storage locations have been evaluated, then as indicated by the negative exit from 850, the retention evaluation may end. The remote storage partition may then be copied to a remote data store, as indicated at 860. In some embodiments, the data values in the assigned storage locations may be deleted, cleared, or otherwise marked as available for deletion or storage of new data.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of dynamic assignment of logical partitions according to query predicate evaluations as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired techniques, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 9:
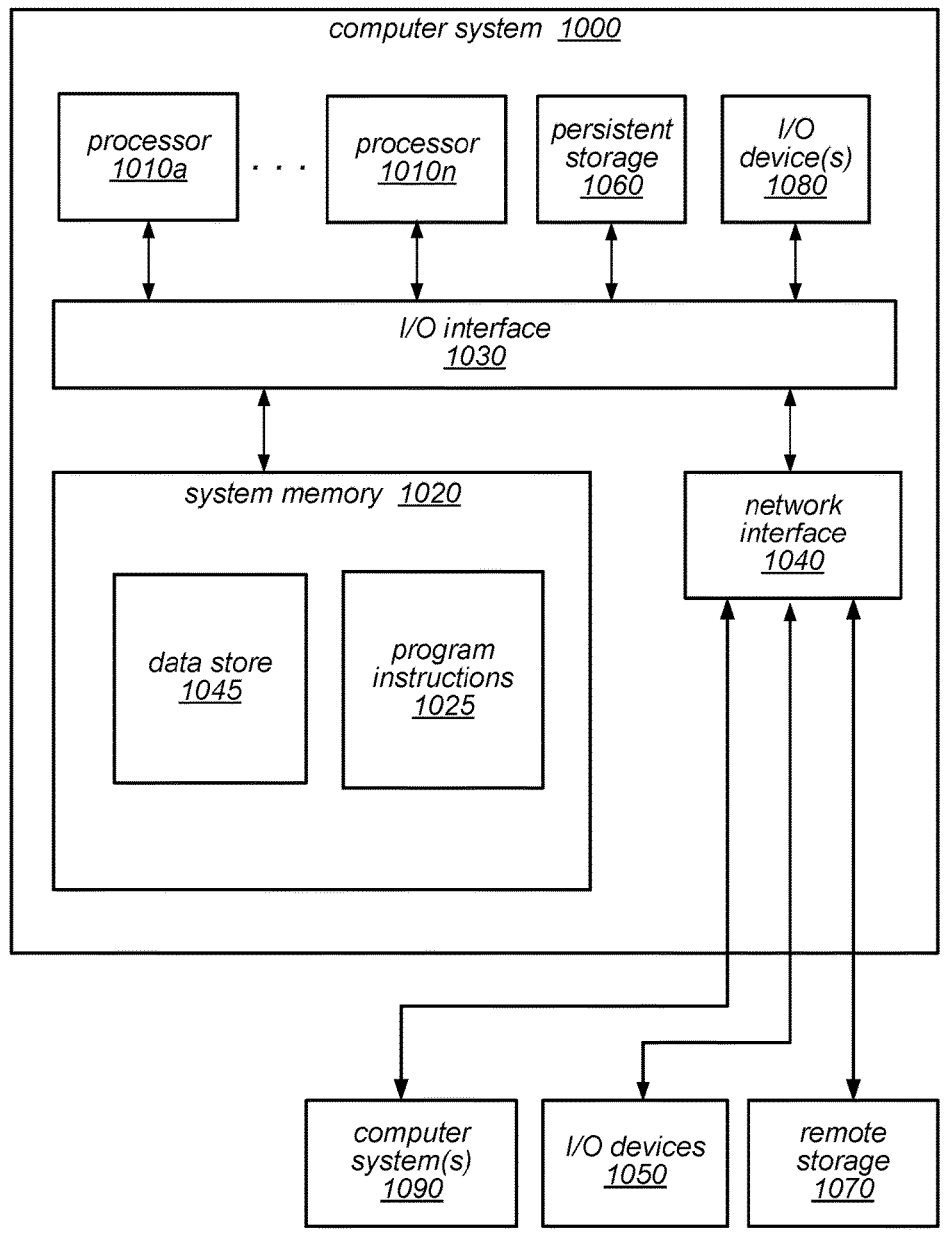
FIG. 9 illustrates an example system configured to implement the various methods, techniques, and systems described herein, according to some embodiments.

As shown in FIG. 9, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the figures. Data storage 1035 may include data that may be used in embodiments. In other embodiments, other or different software elements and data may be included.

Those skilled in the art will appreciate that computer system 1000 is merely illustrative and is not intended to limit the scope of the stereo drawing techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
at least one block-based persistent storage device that comprises a plurality of data blocks maintaining respective portions of data as part of a data store;
at least one processor;
a system memory that comprises program instructions that when executed by the at least one processor cause the at least one processor to:
track query predicate evaluations for individual ones of the plurality of data blocks to update a respective query predicate index for the individual data blocks, wherein the respective query predicate index indicates data values not stored in an individual data block as evaluated according to one or more query predicates included in a previous query directed to the data store;
evaluate the query predicate indexes for the individual data blocks to assign the individual data blocks to one or more logical partitions of the data store;
receive a query directed to the data store for particular data;
in response to the receipt of the query:
identify one or more of the logical partitions to access; and
read the individual data blocks assigned to the identified one or more logical partitions to service the query.

2. The system of claim 1, wherein the program instructions further cause the at least one processor to:
detect a data retention event;
in response to the detection of the data retention event:
evaluate the query predicate indexes for the individual data blocks to identify one or more of the individual data blocks to assign to a remote storage partition; and
send a copy of the remote storage partition to a remote data store.

3. The system of claim 1, wherein to evaluate the query predicate indexes for the individual data blocks, the program instructions cause the at least one processor to implement automatic selection of one or more query predicates indicated in the query predicate indexes, wherein the assignment of the individual data blocks to the one or more logical partitions performed according to the indications of the selected one or more query predicates in the query predicate indexes.

4. The system of claim 1, wherein the system is a compute node of a plurality of compute nodes that together comprises a cluster for storing the data as a part of a distributed data warehouse, wherein the data is maintain for the distributed data warehouse in columnar fashion, and wherein the distributed data warehouse is implemented as a network-based service.

5. A method, comprising:
performing, by one or more computing devices:
maintaining respective query predicate indexes for individual storage locations that store a portion of data maintained as part of a data store that indicate data values not stored in an individual storage location as evaluated according to query predicates included in a previously received query;
evaluating the query predicate indexes for the individual storage locations to assign the individual storage locations to at least one logical partition of the data store; and
receiving a query directed to the data store; and
in response to receiving the query, providing access to the data store according to the at least one logical partition of the data store.

6. The method of claim 5,
wherein the method further comprises receiving a request from a client of the data store that specifies one or more query predicates for logical partitioning;
wherein evaluating the query predicate indexes evaluates the specified one or more query predicates in the request to assign the individual storage locations.

7. The method of claim 5, wherein the query predicate indexes are bitmaps, wherein individual bits of the bitmaps map to different ones of the evaluated query predicates.

8. The method of claim 5, wherein the query is directed to the data store for particular data, and wherein providing access to the data store according to the at least one logical partition of the data store comprises:
generating a query execution plan for servicing the query;
initiating execution of the query execution plan at one or more compute nodes of the data store; and
excluding from the execution of the query plan one or more of the logical partitions at one of the compute nodes.

9. The method of claim 5, wherein at least one of the storage locations is assigned to a plurality of logical partitions.

10. The method of claim 5, further comprising:
in response to updating the query predicate indexes for one or more storage locations, modifying the assignment of the one or more storage locations to a different logical partition.

11. The method of claim 5, wherein at least some of the individual storage locations are assigned to a remote storage partition, and wherein the method further comprises:
sending a copy of the portions of the data at the at least some individual storage locations to a remote data store for storage.

12. The method of claim 5, wherein evaluating the query predicate indexes for the individual storage locations to assign the individual storage locations comprises automatically selecting one or more query predicates indicated in the query predicate indexes, wherein the assignment of the individual data blocks to the at least one logical partition performed according to the indications of the selected one or more query predicates in the query predicate indexes.

13. The method of claim 5, wherein the data store is a distributed data store such that the data is stored across a plurality of compute nodes.

14. A non-transitory, computer-readable storage medium, storing program instructions that when executed by one or more computing devices cause the one or more computing devices to implement:
tracking query predicate evaluations for individual storage locations that store a portion of data maintained as part of a data store to update a respective query predicate index for the individual storage locations, wherein the respective query predicate index indicates data values not stored in an individual storage location according to one or more query predicates included in a previously received query;
evaluating the query predicate indexes for the individual storage locations to assign the individual storage locations to at least one logical partition of the data store; and
receiving a query directed to the data store; and
in response to receiving the query, processing the request according to one or more logical partitions identified for servicing the query.

15. The non-transitory, computer-readable storage medium of claim 14, wherein the query directed to the data store for particular data, and wherein, in processing the query according to the one or more logical partitions, the program instructions cause the one or more computing devices to implement:
  generating a query execution plan for servicing the query;
  initiating execution of the query execution plan at one or more compute nodes of the data store; and
  excluding from the execution of the query plan one or more of the logical partitions at one of the compute nodes.

16. The non-transitory, computer-readable storage medium of claim 14, wherein the program instructions cause the one or more computing devices to further implement:
  in response to updating the query predicate indexes for one or more storage locations, modifying the assignment of the one or more storage locations to a different logical partition.

17. The non-transitory, computer-readable storage medium of claim 14, wherein at least some of the individual storage locations are assigned to a remote storage partition, and wherein the program instructions cause the one or more computing devices to further implement:
  sending a copy of the portions of the data at the at least some individual storage locations to a remote data store for storage.

18. The non-transitory, computer-readable storage medium of claim 14,
  wherein the program instructions cause the one or more computing devices to further implement receiving a request from a client of the data store that specifies one or more query predicates for logical partitioning;
  wherein evaluating the query predicate indexes evaluates the specified one or more query predicates in the request to assign the individual storage locations to the one or more logical partitions.

19. The non-transitory, computer-readable storage medium of claim 14, wherein one of the one or more logical partitions includes storage locations from different ones of a plurality of physical partitions.

20. The non-transitory, computer-readable storage medium of claim 14, wherein the data is stored across a plurality of compute nodes of network-based storage service and wherein requests directed to the data store are received via network interface for the network-based storage service.

* * * * *